(12) United States Patent
Studnicka

(10) Patent No.: US 11,341,713 B2
(45) Date of Patent: May 24, 2022

(54) METHOD FOR GENERATING AN ORTHOGONAL VIEW OF AN OBJECT

(71) Applicant: RIEGL LASER MEASUREMENT SYSTEMS GMBH, Horn (AT)

(72) Inventor: Nikolaus Studnicka, Vienna (AT)

(73) Assignee: RIEGL LASER MEASUREMENT SYSTEMS GMBH, Horn (AT)

(*) Notice: Subject to any disclaimer, the term of this patent is extended or adjusted under 35 U.S.C. 154(b) by 0 days.

(21) Appl. No.: 17/275,278

(22) PCT Filed: Sep. 16, 2019

(86) PCT No.: PCT/EP2019/074693
§ 371 (c)(1),
(2) Date: Mar. 11, 2021

(87) PCT Pub. No.: WO2020/058184
PCT Pub. Date: Mar. 26, 2020

(65) Prior Publication Data
US 2022/0044473 A1 Feb. 10, 2022

(30) Foreign Application Priority Data
Sep. 17, 2018 (EP) .................................... 18194763

(51) Int. Cl.
*G06T 15/20* (2011.01)
*G01S 17/894* (2020.01)
*G06T 15/04* (2011.01)

(52) U.S. Cl.
CPC ............ *G06T 15/20* (2013.01); *G01S 17/894* (2020.01); *G06T 15/04* (2013.01); *G06T 2210/56* (2013.01)

(58) Field of Classification Search
None
See application file for complete search history.

(56) References Cited

U.S. PATENT DOCUMENTS 10,032,311 B1 * 7/2018 Taylor .................... G06T 19/006
11,212,463 B2 * 12/2021 Herbst .................... G01C 11/00
(Continued)

FOREIGN PATENT DOCUMENTS

EP           2866198 A2        4/2015

OTHER PUBLICATIONS

PCT International Search Report for corresponding Application No. PCT/EP2019/074693, dated Nov. 22, 2019.
(Continued)

*Primary Examiner* — Nurun Flora
(74) *Attorney, Agent, or Firm* — Hoffmann and Baron, LLP

(57) ABSTRACT

The disclosed subject matter relates to a method for generating an orthogonal view of an object in a surrounding area, comprising the following steps: creating a location-based first 3D point cloud over a predefined angular range around a first location by way of a laser scanner; representing the object in a computer-generated representation; selecting a view direction and a view boundary in the computer-generated representation; projecting the first 3D point cloud, or a derived first 3D point cloud derived therefrom, counter to the view direction onto a plane defined by the view boundary; and outputting the first 3D point cloud, or the derived first 3D point cloud, projected onto the plane within the view boundary as an orthogonal view.

13 Claims, 6 Drawing Sheets

(56) References Cited

U.S. PATENT DOCUMENTS

| | | | |
|---|---|---|---|
| 2006/0182314 A1* | 8/2006 | England | G01C 15/002 382/106 |
| 2010/0207936 A1* | 8/2010 | Minear | G06T 7/30 345/419 |
| 2010/0208981 A1* | 8/2010 | Minear | G06T 11/001 382/154 |
| 2011/0187704 A1* | 8/2011 | Chen | G06T 15/00 345/419 |
| 2014/0132733 A1* | 5/2014 | Mundhenk | H04N 13/25 348/47 |
| 2016/0299661 A1* | 10/2016 | Alpert | H04L 67/18 |
| 2019/0156507 A1* | 5/2019 | Zeng | G06T 7/70 |

OTHER PUBLICATIONS

Extended European Search Report for correponding Application No. 18194763.1-1003, dated Mar. 8, 2019.
Written Opinion of the International Preliminary Examining Authority for corresponding Application No. PCT/US2019/074693, dated May 28, 2020.
https://www.youtube.com/watch?v=ITkG-2dUzn8.
https://www.youtube.com/watch?v=Lh1bCWr1Xnw.
EP Office Action for correponding Application No. 18194763.1-1001, dated Mar. 1, 2021 with Machine Translation.
International Preliminary Report on Patentability dated Feb. 11, 2021 in corresponding International Application No. PCT/EP2019/074693.

* cited by examiner

METHOD FOR GENERATING AN ORTHOGONAL VIEW OF AN OBJECT

CROSS-REFERENCE TO RELATED APPLICATIONS

This application is a National Phase application of International Application No. PCT/EP2019/074693 filed Sep. 16, 2019 which claims priority to the European Patent Application No. 18 194 763.1 filed Sep. 17, 2018, the disclosures of which are incorporated herein by reference.

TECHNICAL FIELD

The present disclosed subject matter relates to a method for generating an orthogonal view of an object in a surrounding area.

BACKGROUND

In many professional activities, in particular those related to architecture, highway construction or urban planning, there is a great need for plan and elevation drawings, so-called "orthogonal views," of existing buildings or, generally speaking, of the streetscape or landscape. Such drawings or orthogonal views, which are two-dimensional views of a building, a streetscape or a landscape, are used, for example, to renovate existing buildings, or to newly plan structures in the city or in the countryside.

At present, surveyors or photogrammeters are used for such orthogonal views, to initially either carry out a manual survey using total stations, leveling instruments, goniometers, laser rangefinders and the like, or carry out an automatic survey using cameras or laser scanners and thereafter manually create CAD drawings (vector graphics) or orthogonal views. If so-called "orthophotos" are created from photos, these generally require additional manual post-processing.

Manual surveying ("pacing") is a time-consuming and cumbersome process. Automatic surveying using cameras also does not yet provide orthogonal views since cameras, when recording an image, are situated in a single location, whereby the recorded images are subject to perspective distortion. The same problems occur with laser scanners, which emit a plurality of laser measuring beams from one location and create a plurality of scan points (a "point cloud") of the surrounding area, for example from time-of-flight measurements of the laser measuring beams reflected by the surrounding area. The point clouds thus created, however, in turn only render the surrounding area proceeding from the location of the laser scanner and are therefore, similarly to camera images, subject to perspective distortion from the recording location thereof.

US 2006/0182314 A1 describes a method for creating an orthogonal view, proceeding from a point cloud recorded by a laser scanner. In the process, the user must select a viewpoint within a 3D view, based on which the orthogonal view is created.

EP 2 866 198 A2 discloses a method in which salient directions are computationally ascertained in a point cloud. A user can select from a plurality of salient directions so as to, based thereon, create an orthogonal view.

BRIEF SUMMARY

It is the object of the disclosed subject matter to create a method for creating orthogonal views which is more flexible and less complex than known surveying methods.

According to the invention disclosed subject matter, this object is achieved by a method for generating an orthogonal view of an object in a surrounding area, comprising the following steps: creating a location-based first three-dimensional (3D) 3D point cloud over a predefined angular range around a first location, wherein the first 3D point cloud is created by way of a laser scanner situated at the first location so that the first 3D point cloud maps at least a portion of the object; representing the object in a computer-generated representation, wherein the computer-generated representation is a two-dimensional (2D) top view of the object; selecting a view direction and a view boundary in the computer-generated representation; projecting the first 3D point cloud counter to the view direction onto a plane defined by the view boundary; and outputting the first 3D point cloud projected onto the plane within the view boundary as an orthogonal view.

The method according to the disclosed subject matter creates the option of processing laser scan point clouds in such a way that it is possible to derive orthogonal views therefrom. The disclosed subject matter thus makes it possible to extract several different orthogonal views of objects mapped in the point cloud from a single point cloud. This is particularly valuable because, during the creation of the point cloud, it is generally not yet established which orthogonal view a user will in fact require at a later point in time. In this way, it is possible to generate multiple orthogonal views from a single object mapped in the point cloud, for example both a front view and a side view of a building.

The view boundary may serve two aspects, namely, on the one hand, the determination of the image area (left, right, top, bottom) of the orthogonal view and, on the other hand, the image depth so as to hide portions of the point cloud situated "in front of" or "behind" the desired view, for example a tree situated in front of a building. The view direction, in turn, determines the direction from which the object to be mapped is to be viewed. These steps also make it possible for the point cloud to be recorded in advance, and for the orthogonal views to only be created individually at a later point in time.

According to an embodiment of the disclosed subject matter, at least two location-based point clouds are used for creating the orthogonal view. For this purpose, the method can comprise the following steps: creating at least one second location-based 3D point cloud which was created around a second location; and aligning the first 3D point cloud with the second 3D point cloud based on the different locations, wherein the projecting of the first 3D point cloud also encompasses projecting the second 3D point cloud counter to the view direction onto the aforementioned plane, and the outputting also encompasses outputting the second 3D point cloud projected onto the plane.

In this embodiment, thus at least two point clouds, recorded in different locations, are used, and are combined to a shared orthogonal view during the projection. This is particularly advantageous since, as a result of the second point cloud, it is possible to represent portions of the object in the orthogonal view which were not mapped in the first point cloud, for example since there portions of a building facade were covered by a building jetty, a car or a tree.

It shall be understood that this approach is not limited to two point clouds, but can be expanded to an arbitrary number of point clouds. This opens up additional advantages so that, for example, an entire road, city, or even an entire country can be "charted" using point clouds and stored in the form of a database. Architects, engineers or, generally speaking, users interested in an orthogonal view of an arbitrary building captured by the collectivity of point clouds can create these themselves by simply indicating the view boundary and the view direction. Compared to the traditional creation of orthogonal views of all sorts of buildings from all sorts of directions, an enormous amount of time and work is thus saved.

The mutual alignment of the point clouds can be improved in a variety of ways. First, the alignment can be carried out based on angular orientations measured during the creation of the first and second 3D point clouds. This allows a rapid, and in particular resource-conserving, alignment since only the angular orientations of the laser scanners at the point of time of the creation of the point cloud must be known. The angular orientations can be measured in absolute terms for this purpose, for example com-pared to the magnetic field, or relative to one another, for example by way of a gyroscope, which measures the change in movement from the first to the second location.

Secondly, the aligning can be carried out by locating, in a computer-assisted manner, identical features in the first and second 3D point clouds, for example as a result of the agreement of building walls, vehicles or the like. The features can be identified in advance, in particular when reference targets are used for referencing, or by counter-rotating the point clouds until these agree in features.

The method according to the disclosed subject matter enables a plurality of application or implementation options, of which the following three embodiments are particularly envisaged.

In a first embodiment, each 3D point cloud, after creation, is transmitted directly to a terminal, and the steps of representing, selecting, projecting and outputting are carried out on the terminal. This is particularly advantageous when the creation of the point cloud and the creation of the orthogonal views are carried out by the same entity, for example when the point clouds created by way of the laser scanner are only used within a company. In this case, the point clouds can be directly transmitted to the terminal, for example a workstation, a laptop, a cell phone and the like, for example via the Internet, via a WLAN connection between the laser scanner and the terminal, via a hard-wired LAN interface, or also by way of a data carrier, such as USB sticks.

In a second embodiment, each 3D point cloud, after creation, is transmitted to a server, the representing of the object is carried out on a terminal connected to the server via a network, the selection of the view direction and of the view boundary is transmitted from the terminal to the server, the projecting is carried out in the server, and the outputting of the orthogonal view is carried out by transmitting the orthogonal view from the server to the terminal. This embodiment allows a server-based generation of the orthogonal view. The terminal, for example a laptop, a workstation or a smart phone, is only used to select the view boundary and the view direction, so that all computationally intensive method steps, and in particular the projection, take place in the server. It is furthermore particularly advantageous that the data transfer via the network is extremely low since the high-information point clouds do not have to be transferred to the terminal.

In a third embodiment, each 3D point cloud is transmitted to a server, information regarding a desired geographical region is transmitted from the terminal to the server, and only the 3D point cloud which is at least partially situated in the aforementioned geographical region is transmitted to the terminal, and the steps of representing, selecting, projecting and outputting are carried out on the terminal. This is a mixed variant that essentially combines the advantages of the two aforementioned embodiments. In the process, a plurality of point clouds can be stored in the server, for example of a district, a city or a country. The user can download point clouds that are relevant for him or her and personally carry out the computationally intensive steps, so that the server only has to provide storage capacities. An extensive roll-out of such a system is also facilitated by the technical functionality of customization since here architects or city planners are able to individually acquire individual point cloud packages of roads, districts or cities from the provider of the point clouds so as to then be able to create orthogonal views locally according to their own desires.

In the case of the server-based approaches of the second and third embodiments, the point clouds can already be recorded in advance, for example by way of extensive surveying. The users can then be offered access to the point clouds by way of a browser-based platform, so as to create arbitrary orthogonal views in freely selectable locations in the surrounding area. The point clouds can be individually distributed, which also minimizes the transmitted data volume. In particular, point clouds, representations or derived point clouds can be bundled either according to predefined territories or according to the selection of the view direction and the view boundary so as to facilitate the distribution between the server and the terminal.

The aforementioned computer-created representation in which the user selects the view direction and boundary can, for example, be provided in the form of a map by a third-party provider. For this purpose, the map can be read out from a local memory, for example, or be downloaded from the Internet.

In another embodiment however, the computer-generated representation of the object in which the view direction and boundary are selected is obtained from the 3D point cloud itself, or the 3D point clouds themselves, for example by data reduction thereof. The representation thus created can, for example, be a simplified, also combined, range, color and/or intensity image of the surrounding area, which can be provided to the user with little need for bandwidth via the Internet for the selection of the view direction and boundary.

Representations distributed in this way, for example via the Internet, to the user can additionally, in a particularly advantageous manner, then also be used directly as simplified ("derived") 3D point clouds of the original 3D point cloud when they also contain distance information ("depth information"), which is also referred to as "2.5D." A derived, simplified or user-adapted 3D point cloud can be "reconstructed" from such 2.5D representations, from which then the desired orthogonal view is created in the selected view direction and boundary by projection. In other words, the derived first 3D point cloud is thus optionally created from the computer-generated representation itself, and the projecting is carried out based on the derived first 3D point cloud. With this, the data to be transmitted can be further reduced, in particular in the case of server-based approaches, since the (generally data-reduced) 2.5D or 3D object representations also represent the derived point clouds to be distributed to the user.

As an alternative, the derived point cloud can be created by a data reduction of the first point cloud, for example directly in the laser scanner or by data processing in the server. For this purpose, for example, points of the point cloud that are too close to other points can be deleted, thereby effectively reducing the point density.

During the creating of each 3D point cloud, a color image is also optionally recorded over the predefined angular range, and the point cloud is combined with the color image, so that the orthogonal view is output with corresponding color values. This enables color orthogonal views which are not achievable using conventional mapping methods since panorama color images, by nature, cannot offer a genuine orthogonal view.

BRIEF DESCRIPTION OF THE DRAWINGS

The disclosed subject matter will be described hereafter in greater detail based on exemplary embodiments shown in the accompanying drawings. In the drawings.

DETAILED DESCRIPTION

Figure 1:
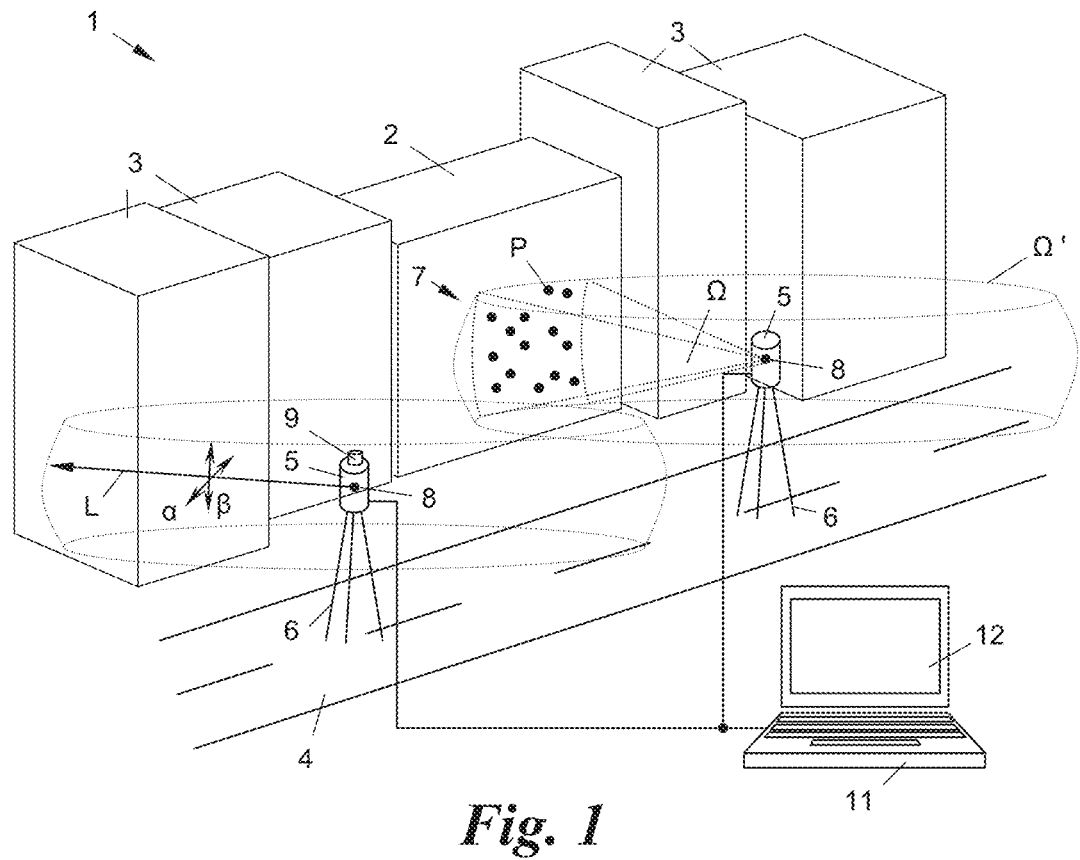
FIG. 1 shows an object in a surrounding area including multiple components used in the method of the disclosed subject matter, in a schematic perspective view.

FIG. 1 shows a surrounding area 1 in which an object 2 is situated. The object 2 is a house, for example, which is situated in the surrounding area 1, in addition to other houses 3 along a road 4, generally speaking in a streetscape. Other examples of objects 2 include castles, bridges, industrial buildings, landscapes, open pit or underground mines, and the like.

The goal of the method described hereafter is to survey the object 2 and to generate a drawing, that is, an orthogonal view, thereof. One or more laser scanners 5 are used for this purpose, which are supported, for example, by a tripod 6 at a working height.

For the creation of a 3D point cloud 7 of the surrounding area 1, each laser scanner 5 emits, for example, a plurality of laser beams L over a predetermined angular range $\Omega$ (solid angle), wherein the surrounding area 2 is surveyed in the form of range finding points P based on the reflections of the laser beams L registered in the laser scanner 5, for example using time-of-flight or interference measurement. The collectivity of the range finding points P forms the 3D point cloud 7. For reference, the respective emission direction of the laser beams L is indicated, for example, in the horizontal plane as azimuth $\alpha$, and as elevation $\beta$ in a perpendicular plane parallel to the azimuth $\alpha$. The laser beams L emitted via the respective emission directions $\{\alpha, \beta\}$ are optionally uniformly distributed over the predetermined angular range $\Omega$.

In the example of FIG. 1, an angular range $\Omega$ is shown for the right laser scanner 5, which has an angular range of 0° to 30° (proceeding from an arbitrarily selected origin) in azimuth $\alpha$, and an angular range of −15° to +15° (proceeding from the horizontal plane) in elevation $\beta$. As an alternative, an angular range $\Omega'$ is furthermore shown, which in azimuth $\alpha$ spans an angular range of 0° to 360°. Even though the illustrated angular range $\Omega'$ spans a limited angular range of −15° to +15° in elevation $\beta$ in the shown example, it could also span an angular range of up to −90° to +90°, so that the angular range $\Omega'$ could also be shaped as a sphere.

The point cloud 7 can link, as points P, either the range finding values of the laser measuring beams L with the particular emission direction $\{\alpha, \beta\}$ or already convert the range finding values into, for example, a Cartesian coordinate system, for example into a global coordinate system, when the location 8 of the laser scanner at the point in time of the creation of the point cloud 7 is georeferenced, for example by way of GPS positions.

Figure 2:
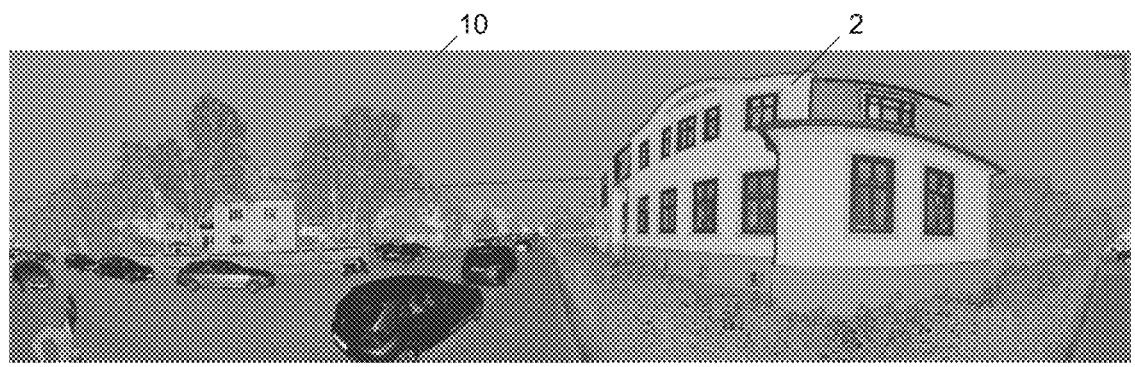
FIG. 2 shows an exemplary location-based panorama image of the object of FIG. 1.

In addition to the creation of the 3D point cloud 7, it is also possible to record one or more color images 10 over the predefined angular range $\Omega$ by way of a camera 9, of which one is shown by way of example in FIG. 2. Thereafter, the point cloud 7 can be combined with the color image(s) 10, that is, each point P of the point cloud 7 can be assigned a color value. In this way, it is also possible to output the subsequently created orthogonal views in color.

So as to store the color values together with the points P, the color value could, for example, be converted into a black and white value (provided it was not already recorded in this way) and stored in a color channel of an RGB image, while the associated range finding value of the point P could be stored in the other two color channels (or only in one of the color channels).

As is apparent from FIG. 2, point clouds 7 or color images 10 created in a location-based manner always map the recorded surrounding area 1, including the object 2, in a curved manner, whereby recorded planes are represented in a distorted manner, as is clearly apparent in the case of the house 2 in FIG. 2. For this reason, drawings or orthogonal views are not discernible from such location-based views.

For further processing, each point cloud 7, after creation by the respective laser scanner 5, is thus transmitted to a terminal 11, for example a laptop, a workstation, a cell phone or the like. The transmission can take place arbitrarily, for example online directly after or during the creation of the point cloud(s) 7 via a wireless or hard-wired interface, or also offline, only after one or more point clouds 7 have been created, for example with the aid of a data carrier such as a USB stick.

Figure 3:
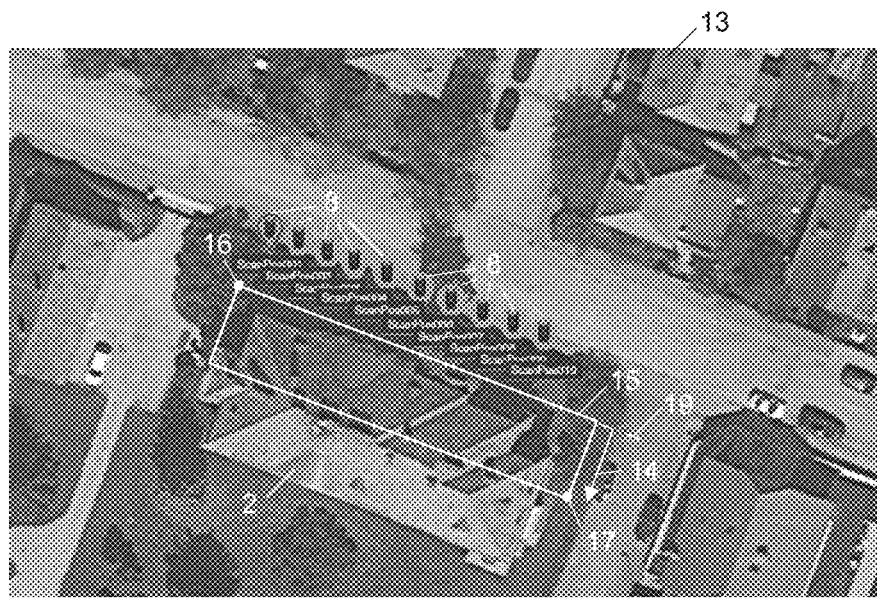
FIG. 3 shows a representation of the object of FIG. 1 in a computer-generated representation while the method of the disclosed subject matter is being carried out.

As is shown in FIG. 3, the terminal 11 represents the object 2 to the user on a monitor 12 in a computer-generated representation 13. In the simplest case, this representation 13 is a geographical map mapping the object 2, as is illustrated in the example of FIG. 3. The representation 13 does not even have to contain information about the recorded point cloud 7 itself, that is, may be decoupled therefrom. The representation 13 may be acquired by a third-party provider, for example by Google Maps. In the illustrated example, however, at least the locations 8 of the point clouds 7 are plotted in the representation 13 so as to provide the user with information regarding the availability of point clouds 7.

In another embodiment, a representation 13 is selected which represents the point cloud 7 (or several point clouds 7, as will be described hereafter) directly, for example in a top view, instead of a map that is independent of the point cloud 7. This allows the user to know what data the point cloud(s) 7 offers/offer even before the orthogonal view is created. Such representations 13 can be range, color and/or intensity images, depending on the design. The representations 13 are 2D, 2.5D or 3D representations, depending on the embodiment. 2.5D representations shall be understood to mean 2D images that additionally code range or depth information, for example as depth information "hidden" in a color channel of the image that is not used here.

If the representation 13 has been obtained directly from the point cloud(s) 7 as a 2.5D or 3D representation 13, it is possible to again reconstruct a point cloud 7' from such a 2.5D or 3D representation 13, which is referred to here as a "derived" point cloud 7' of the point cloud 7. For example, the range finding points P of the point cloud 7 which are not relevant for the computer-generated representation 13 remained without consideration in the representation 13. In this case, the size of a derived point cloud 7' reconstructed from the representation 13 is smaller than that of the original point cloud 7.

So as to now generate an orthogonal view of the object 2, the user selects a view direction 14 and a view boundary 15 in the computer-generated representation 13. When the representation 13 is a top view, be it as a map including the plotted object 2, or also directly derived from the point cloud(s) 7, the view boundary 15 can be plotted particularly easily as a rectangle in the map, for example by a first click on a starting point 16 and a second click on a diagonal end point 17. As an alternative, the first click can be carried out by depressing a mouse button or an input key, and the second click can be carried out by releasing the same button or key ("drawing up a frame using the mouse"). At the same time, one of the shorter sides of the rectangle can be selected as a view direction when the direction from the starting point to the end point 16, 17 is also taken into consideration.

When the computer-generated representation 13 is not a 2D, but a perspective 3D view, the view boundary 15 can, for example, be indicated as a cuboid in the 3D view. The view direction 14 can be automatically ascertained in the direction of the plane (for example a wall) that is present in the point cloud and located closest to the cuboid.

The view boundary 15 illustrated in FIG. 3 provides delimitation in two dimensions, which are defined by the illustrated rectangle. In addition, a height or depth delimitation can be selected, for example by a preset or settable numerical value. The view boundary 15 is therefore optionally a cuboid, even if the representation 13 is two-dimensional.

Figure 4:
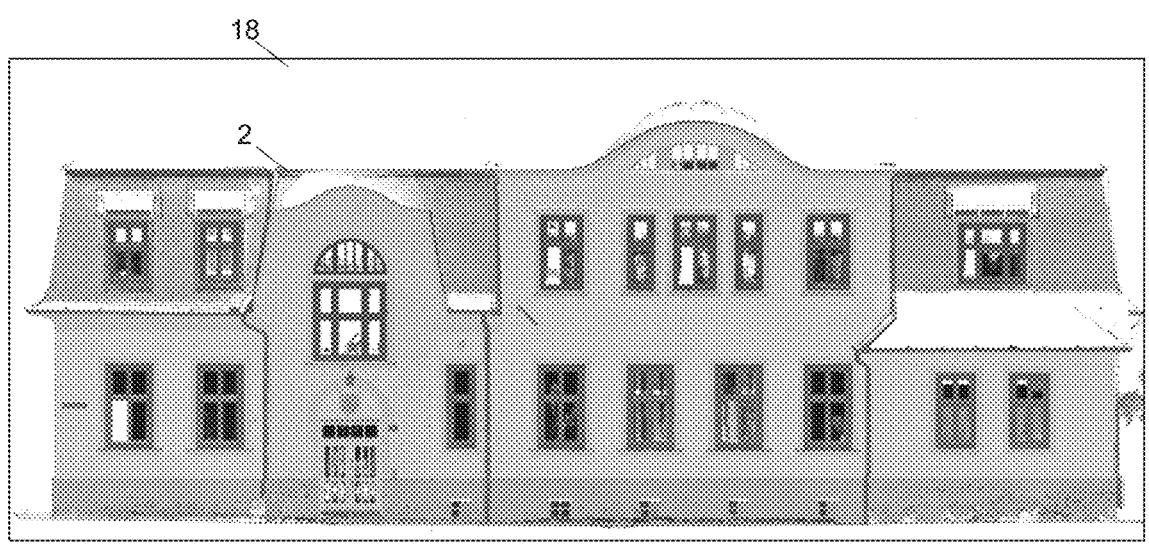
FIG. 4 shows an orthogonal view of the object of FIG. 1 generated by the method of the disclosed subject matter.

For the generation of the orthogonal view 18, which is shown as a result in FIG. 4, the terminal 11 now projects the 3D point cloud 7, or the derived point cloud 7', whether the latter was created directly from the point cloud 7 by data reduction or reconstructed from a 2.5D or 3D representation 13 created from the point cloud 7, counter to the view direction 14 onto a plane defined by the view boundary 15. One side of the view boundary 15 is optionally situated in the plane (for example, one side of the cuboid view boundary is situated in the plane). This plane is optionally normal to the view direction 14. This is why, overall, the side of the cuboid view boundary is situated in the plane that is situated at the front, seen in the view direction 14. In the example of FIG. 3, the plane extends vertically and is parallel to the front side 19, seen in the view direction, of the rectangle serving as the view boundary. For the creation of a plan drawing, the plane would accordingly extend horizontally.

In a last method step, the orthogonal view 18 thus generated is output, for example by being displayed on the monitor 12 of the terminal 11 or by being printed on a printer connected to the terminal 11.

Instead of creating a single point cloud 7 or derived point cloud 7', and subsequently generating the orthogonal view 18 by way of this single point cloud 7 or 7', it is also possible to create multiple point clouds 7 or 7' in advance. To do so, the laser scanner 5, or another laser scanner 5, is set up in a second location 8, and, based thereon, at least one second location-based point cloud 7 (or derived point cloud 7') is created, as is schematically shown in FIG. 1.

To combine the first and the (at least one) second point cloud 7, these are aligned with respect to one another. This initially takes place based on the different locations 8, that is, the point clouds 7 are positioned at a distance from one another which corresponds to a difference between the two locations 8. In certain cases, an angular orientation of the two point clouds 7 is not required, for example when the point clouds 7 had the same recording direction. As an alternative, it is also possible to combine the derived point clouds 7' when the projection is carried out based on the derived point clouds 7'.

In addition, the alignment can furthermore be carried out based on angular orientations of the laser scanners 5 measured during the creation of the first and second 3D point clouds 7. The angular orientations of the laser scanners 5 can, for example, be measured in absolute terms (for example using the magnetic field of the earth for reference) or have a relative relationship, for example as a result of a measurement by way of a gyroscope, if the same laser scanner 5 was relocated from the first location 8 to the second location 8.

As an alternative or in addition, the alignment can furthermore be carried out by locating, in a computer-assisted manner, identical features in the first and second 3D point clouds 7 or 7'. The features can be identified in advance, in particular when easily identifiable, known "targets," such as highly reflective marking objects or marking objects having a known form, are used for referencing, or by trial and error by counter-rotating the point clouds until they agree in the found features.

After the (at least two) point clouds 7 or derived point clouds 7' have been aligned, these can be treated like a single point cloud 7 or a single derived point cloud 7'. In particular, the points P of the individual point clouds 7, 7' can also be stored as a combined point cloud 7, 7'.

So as to generate the orthogonal view 18 based on two or more point clouds 7 or 7', the projection of the first 3D point cloud 7 or 7' also encompasses projecting the second 3D point cloud 7 or 7' counter to the view direction 14 onto the aforementioned plane 19. If the multiple point clouds 7 or 7' were combined in a single point cloud, accordingly only one projection takes place, otherwise more than one takes place.

Figure 5:
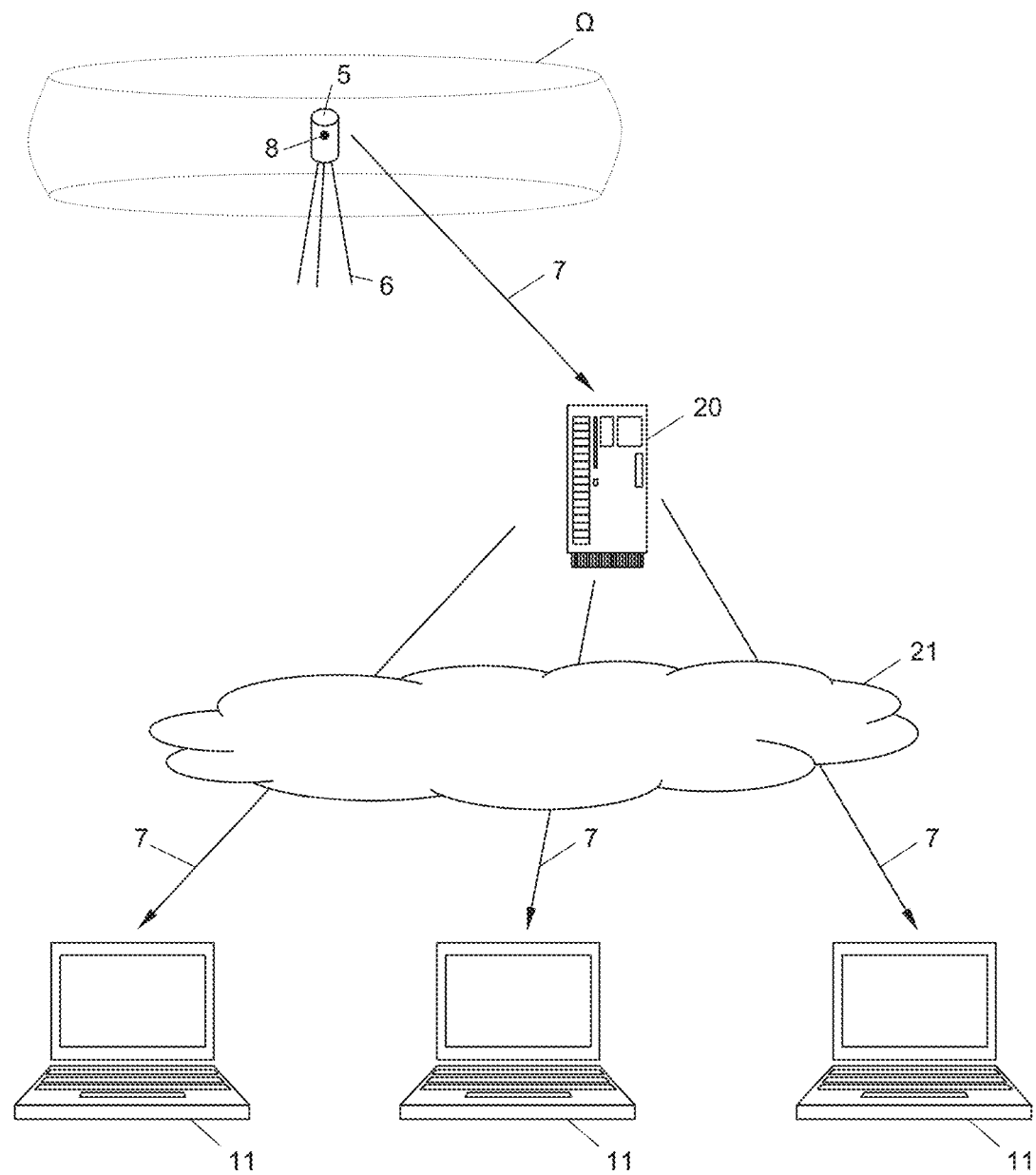
FIG. 5 shows a laser scanner, a server, and three terminals for carrying out another embodiment of the method of the disclosed subject matter, in a schematic view.

FIG. 5 shows that the point clouds 7 or derived point clouds 7' do not have to be transmitted directly to a terminal 11, but can also be transmitted to a server 20, which has an accordingly large memory for storing a plurality of point clouds 7, 7'. For example, the point clouds 7, 7' of entire cities or countries are stored in the server 20. The terminals 11, which do not themselves have the point clouds 7, 7' at their disposal, serve as interfaces to the users who want to generate the orthogonal view 18. The terminals 11 are connected to the server 20, for example, by way of a network 21, such as the Internet.

In a first server-based embodiment, the server 20 carries out all computationally intensive steps itself. After each 3D point cloud 7 has been transmitted to the server 20 after creation, the object 2 is represented in the representation 13 on the terminal 11. Thereafter, the user selects the view direction 14 and the view boundary 15 in the representation 13, and the selection of the view direction 14 and of the view boundary 15 is transmitted from the terminal 11 to the server 20. The server 20 thereafter carries out the projection and outputs the orthogonal view 18 by transmit-ting the orthogonal view 18 from the server 20 to the terminal 11.

In a second server-based embodiment, the server 20 is only used as a storage unit for a plurality of point clouds 7, which can be selectively transmitted to the users. After each 3D point cloud 7 has been transmitted to the server 20 after creation, information regarding a desired geographical region is transmitted for this purpose from the terminal 11 to the server 20. The information can either be a piece of general information, such as the desired road or city, or it can directly be the view direction 14 and the view boundary 15. Consequently, only the 3D point cloud(s) 7, 2.5D or 3D representations 13 or derived points clouds 7' are transmitted to the terminal 11 which are at least partially located in the aforementioned geographical region, and the steps of representing, selecting, projecting and outputting are carried out on the terminal 11. Since the aforementioned information can also directly be the view direction 14 and the view boundary 15 (in this case, the object 2 is represented based on a representation 13 that is independent of the point clouds 7), the steps of representing and selecting can take place either before or after the transmission of the point cloud(s) 7 from the server 20 to the terminal 11.

Figure 6:
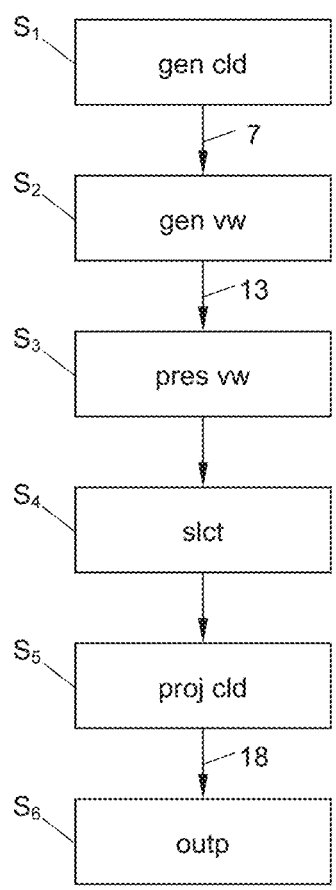
FIG. 6 shows a flow chart of a first embodiment of the method according to the disclosed subject matter.

FIG. 6 shows the above-described method in a first embodiment, which can be carried out in a server-less manner, for example. In the process, the point cloud 7 is created in a first step $S_1$, and the representation 13 is obtained from the point cloud 7 in a second step $S_2$, for example in the form of a 2D, 2.5D or 3D representation of the point cloud 7. The representation 13 is represented in a third step $S_3$, for example on the monitor 12 of the terminal 11, whereupon the view direction 14 and the view boundary 15 in the representation 13 are selected in a step $S_4$. After the projection in a step $S_6$, the orthogonal view is output in a step $S_5$.

Figure 7:
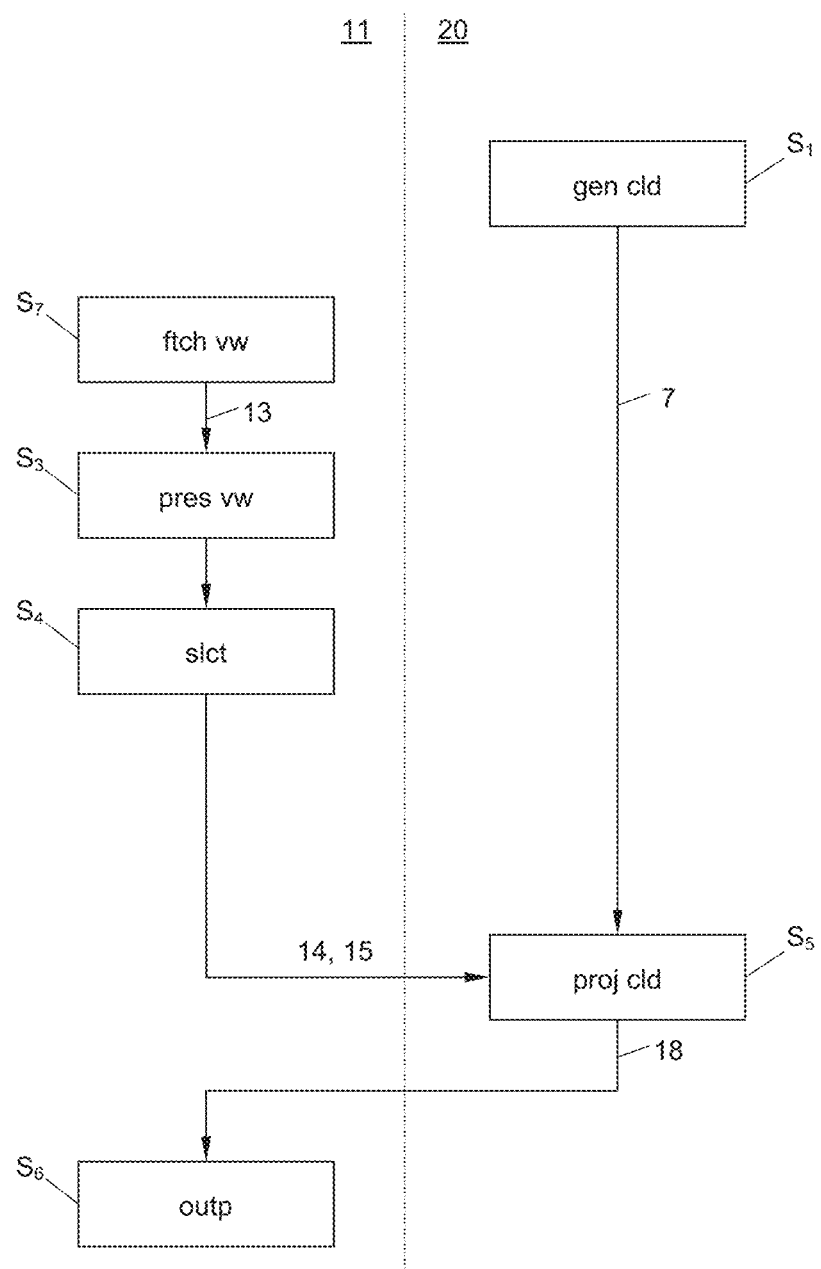
FIG. 7 shows a flow chart of a second embodiment of the method according to the disclosed subject matter.

FIG. 7 shows another embodiment in which the steps illustrated on the left take place in the terminal 11, and the steps illustrated on the right are carried out in the server 20 (with the exception of step $S_1$, which is carried out in the laser scanner 5). In this embodiment, the representation 13 is in particular not generated from the point cloud 7 itself, but is received or loaded in a step $S_7$, for example by a third-party provider via the Internet.

In this way, the step $S_1$ of creating the point cloud 7 is independent of the step $S_3$ of representing the representation 13 since the representation 13 is not obtained directly from the point cloud 7. After the view direction 14 and the view boundary 15 have been selected in the terminal 11 in step $S_4$, these are transmitted to the server 20, which carries out the projection in step $S_5$. The orthogonal view 18 thus created is thereupon transmitted to the terminal 11, where it is output in step $S_6$.

Figure 8:
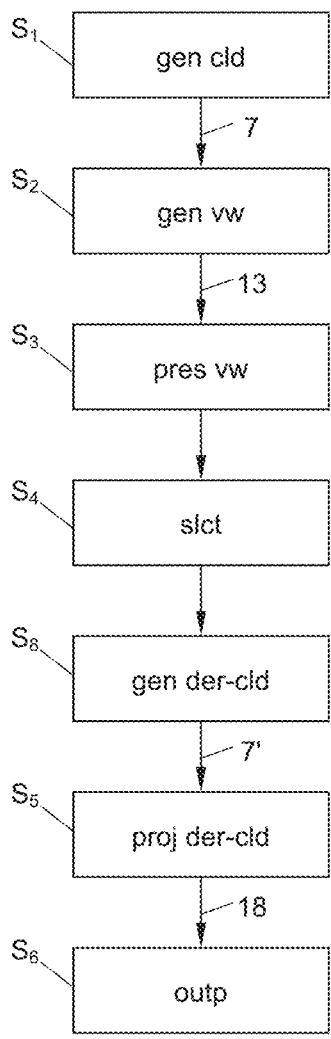
FIG. 8 shows a flow chart of a third embodiment of the method according to the disclosed subject matter.

FIG. 8 shows an embodiment in which the steps $S_5$ of projecting and $S_6$ of outputting take place based on a derived point cloud 7'. In the process, the step $S_2$ of obtaining the representation 13 by data reduction of the point cloud(s) 7 takes place, wherein the representation 13 is present in the form of a 2.5D or 3D representation 13 and is output in step $S_3$, for example, as a 2D view. After (or alternatively before) the step $S_4$ of selecting, the derived point cloud 7' is created from the 2.5D or 3D representation 13 in a step $S_8$, that is, the (derived) point cloud 7' is "reconstructed" from the representation 13 so as to then be able to apply the projection step $S_5$ to the derived point cloud 7'.

Depending on the design of the data reduction in the steps $S_2$ and/or $S_8$, in this way a greater or lesser data reduction can be achieved for the derived point cloud 7'. Data-reduced 2.5D or 3D representations 13 can also be distributed in a bandwidth-conserving manner to terminals 11 having a low bandwidth Internet connection, for example by mobile radio communication, which can reconstruct derived point clouds 7' therefrom for the projection.

In the embodiment of FIG. 8, the step $S_1$ is carried out in the laser scanner 5, and the steps $S_2$-$S_6$, $S_8$ are carried out in the terminal 11. As an alternative, the step $S_2$ is carried out in the server 20, and the steps $S_3$-$S_6$, $S_8$ are carried out in the terminal 11, after the representation 13 has been transmitted from the server 20 to the terminal 11. As another alternative, a mixed form as in the embodiment of FIG. 7 would be possible, wherein the steps $S_2$ and $S_8$ take place in the server 20, and the steps $S_3$, $S_4$, $S_5$ and $S_6$ take place in the terminal 11.

The disclosed subject matter is thus not limited to the shown embodiments, but encompasses all variants, modifications and combinations that are covered by the scope of the accompanying claims.

What is claimed is:

1. A method for generating an orthogonal view of an object in a surrounding area, comprising:
   creating a location-based first three-dimensional (3D) point cloud over a predefined angular range around a first location, wherein the first 3D point cloud is created by way of a laser scanner situated at the first location so that the first 3D point cloud maps at least a portion of the object;
   representing the object in a computer-generated representation, wherein the computer-generated representation is a two-dimensional (2D) top view of the object;
   selecting a view direction and a view boundary in the computer-generated representation;
   projecting the first 3D point cloud counter to the view direction onto a plane defined by the view boundary; and
   outputting the first 3D point cloud projected onto the plane within the view boundary as an orthogonal view;
   wherein the first 3D point cloud, after creation, is transmitted to a server, the representing of the object is carried out on a terminal including a display and a user interface, the terminal being connected to the server, the selection of the view direction and of the view boundary is transmitted from the terminal to the server, the projecting is carried out in the server, and the outputting of the orthogonal view is carried out by transmitting the orthogonal view from the server to the terminal.

2. The method according to claim 1, comprising:
   creating at least one second location-based 3D point cloud which was created around a second location; and
   aligning the first 3D point cloud with the second 3D point cloud based on the different locations;
   wherein the projecting of the first 3D point cloud also encompasses projecting the second 3D point cloud counter to the view direction onto the aforementioned plane, and the outputting also encompasses outputting the second 3D point cloud projected onto the plane.

3. The method according to claim 2, wherein the aligning is furthermore carried out based on angular orientations measured during the creation of the first and second 3D point clouds.

4. The method according to claim 2, wherein the aligning is furthermore carried out by locating, in a computer-assisted manner, identical features in the first and second 3D point clouds.

5. A method for generating an orthogonal view of an object in a surrounding area, comprising:

creating a location-based first three-dimensional (3D) point cloud over a predefined angular range around a first location, wherein the first 3D point cloud is created by way of a laser scanner situated at the first location so that the first 3D point cloud maps at least a portion of the object;

creating at least one second location-based 3D point cloud which was created around a second location;

aligning the first 3D point cloud with the second 3D point cloud based on the different locations;

representing the object in a computer-generated representation, wherein the computer-generated representation is a two-dimensional (2D) top view of the object;

selecting a view direction and a view boundary in the computer-generated representation;

projecting both the first 3D point cloud and the second 3D point cloud counter to the view direction onto a plane defined by the view boundary;

outputting both the first 3D point cloud and the second 3D point cloud projected onto the plane within the view boundary as an orthogonal view;

wherein each 3D point cloud is transmitted to a server, information regarding a desired geographical region is transmitted from a terminal including a display and user interface to the server, and only the 3D point cloud that is at least partially situated in the aforementioned geographical region is transmitted to the terminal, and the steps of representing, selecting, projecting and outputting are carried out on the terminal.

6. The method according to claim 1, wherein the computer-generated representation is obtained from the first 3D point cloud by data reduction.

7. The method according to claim 1, wherein the computer-generated representation is a geographical map mapping the object.

8. The method according to claim 1, wherein, during the creating of each 3D point cloud, a color image is also recorded over the predefined angular range, and the point cloud is combined with the color image, so that the orthogonal view is output with corresponding color values.

9. The method according to claim 5, wherein the aligning is furthermore carried out based on angular orientations measured during the creation of the first and second 3D point clouds.

10. The method according to claim 5, wherein the aligning is furthermore carried out by locating, in a computer-assisted manner, identical features in the first and second 3D point clouds.

11. The method according to claim 5, wherein the computer-generated representation is obtained from the first 3D point cloud by data reduction.

12. The method according to claim 5, wherein the computer-generated representation is a geographical map mapping the object.

13. The method according to claim 5, wherein, during the creating of each 3D point cloud, a color image is also recorded over the predefined angular range, and the point cloud is combined with the color image, so that the orthogonal view is output with corresponding color values.

* * * * *